(12) United States Patent
Ochiai

(10) Patent No.: US 11,089,770 B2
(45) Date of Patent: Aug. 17, 2021

(54) LINE ROLLER

(71) Applicant: Shimano Inc., Osaka (JP)

(72) Inventor: Koji Ochiai, Osaka (JP)

(73) Assignee: Shimano Inc., Osaka (JP)

( * ) Notice: Subject to any disclaimer, the term of this patent is extended or adjusted under 35 U.S.C. 154(b) by 79 days.

(21) Appl. No.: 16/680,354

(22) Filed: Nov. 11, 2019

(65) Prior Publication Data

US 2020/0196585 A1 Jun. 25, 2020

(30) Foreign Application Priority Data

Dec. 21, 2018 (JP) .............................. JP2018-240052

(51) Int. Cl.
*A01K 89/01* (2006.01)
*A01K 89/00* (2006.01)

(52) U.S. Cl.
CPC ........ *A01K 89/0108* (2013.01); *A01K 89/006* (2013.01); *A01K 89/011221* (2015.05); *A01K 89/011222* (2015.05)

(58) Field of Classification Search
CPC ........ A01K 89/0108; A01K 89/011221; A01K 89/011222
See application file for complete search history.

(56) References Cited

U.S. PATENT DOCUMENTS

| | | | | |
|---|---|---|---|---|
| 5,855,327 | A | * | 1/1999 | Kaneko ............... A01K 89/0108 242/231 |
| 5,954,284 | A | * | 9/1999 | Tsukihiji ............ A01K 89/0108 242/231 |
| 6,286,772 | B1 | * | 9/2001 | Koelewyn ............ A01K 89/058 242/246 |
| 2002/0079395 | A1 | * | 6/2002 | Matsuda .......... A01K 89/01081 242/231 |
| 2012/0048981 | A1 | * | 3/2012 | Ohara .................... A01K 89/01 242/230 |

(Continued)

FOREIGN PATENT DOCUMENTS

| | | |
|---|---|---|
| GN | 106962305 A | 7/2017 |
| JP | 2006-101704 A | 4/2006 |

OTHER PUBLICATIONS

GB Search Report of corresponding GB Application No. 1917954.8 dated Jun. 10, 2020.

*Primary Examiner* — Emmanuel M Marcelo
(74) *Attorney, Agent, or Firm* — Global IP Counselors, LLP

(57) ABSTRACT

A line roller for guiding fishing line to a spool of a spinning reel for fishing, includes a cylindrical guide member having a guide surface to guide the fishing line on an outer periphery of the spool, a bearing rotatably supporting an inner circumferential surface of the guide member, a support member supporting an inner circumferential surface of the bearing in a radial direction, a collar abutting an axial side surface of the bearing and fixing the axial position thereof, a waterproof member interposed between the collar and the support member at a contacting surface over the circumference around an axis of rotation of the guide member, and a groove disposed in the collar or the support member at the contacting surface over the entire circumference around the axis of rotation, and the waterproof member being disposed in the groove.

6 Claims, 7 Drawing Sheets

(56) References Cited

U.S. PATENT DOCUMENTS

2016/0073619 A1\*  3/2016  Ochiai ............. A01K 89/01081
                                                  242/230
2017/0164593 A1\*  6/2017  Ochiai ........... A01K 89/011223
2017/0164594 A1\*  6/2017  Ikebukuro ........ A01K 89/01085
2017/0181419 A1\*  6/2017  Ochiai ........... A01K 89/011221

\* cited by examiner

LINE ROLLER

CROSS-REFERENCE TO RELATED APPLICATIONS

This application claims priority to Japanese Patent Application No. 2018-240052, filed on Dec. 21, 2018. The entire disclosure of Japanese Patent Application No. 2018-240052 is hereby incorporated herein by reference.

BACKGROUND

Field of the Invention

The present invention relates to a line roller of a spinning reel used for fishing.

Background Art

A spinning reel used for fishing comprises a spool, a rotor having a pair of rotor arms, and a fishing line guide mechanism (i.e., "a bail arm") that is pivotally mounted on the distal end of the pair of rotor arms. The fishing line guide mechanism guides the fishing line to the spool. The fishing line guide mechanism includes a bail, a pair of bail support members that support the two ends of the bail, and a line roller.

The line roller is supported by a bearing so as to smoothly rotate. It is necessary that water be prevented from entering the bearing. Japanese Published Unexamined Application No. 2006-101704 discloses a spinning reel for fishing that waterproofs and dustproofs the bearing that supports the line roller. The spinning reel of Japanese Published Unexamined Application No. 2006-101704 includes a line roller that is rotatably supported by, via a bearing, a support portion of a support member that is attached to a support arm of a rotor that rotates in conjunction with an operation of the handle, and a seal member that is interposed between the line roller and the support portion. A collar, on which a holding portion of the seal member is disposed, is interposed between the line roller and the bearing, and the seal member is held by the holding portion to enable the distal end of the seal member to be in sliding contact with the support portion side.

In the line roller of Japanese Published Unexamined Application No. 2006-101704, the seal member is in sliding contact with the outer circumferential surface of a washer for fixing the position of the bearing in the axial direction, and the outer periphery of the washer is sealed. However, the contacting surface between the washer and the support portion to which the washer is fitted and the contacting surface between the washer and an arm lever that restrains the washer are joints between hard members, so it is possible for water to enter the bearing through these contacting surfaces.

SUMMARY

In consideration of the circumstances described above, the object of the present invention is to prevent water from entering the bearing between the support member that supports the bearing in the radial direction and the collar that fixes the position of the bearing in the axial direction.

A line roller according to one aspect of the present invention guides fishing line to the spool of a spinning reel for fishing and comprises a cylindrical guide member with a guide surface for guiding the fishing line on an outer periphery, a bearing that rotatably supports the inner circumferential surface of the guide member, a support member that supports the inner circumferential surface of the bearing in the radial direction, a collar that abuts an axial side surface of the bearing and fixes the axial position thereof, and a waterproof member that is interposed between the collar and the support member at a contacting surface thereof over the entire circumference around the axis of rotation of the guide member. A continuous groove is formed on the collar or the support member at the contacting surface between the collar and the support member over the entire circumference around the axis of rotation, and the waterproof member is disposed in the groove.

Preferably, the collar includes a first collar and a second collar that axially sandwich the bearing to fix the axial position thereof. The waterproof member includes a first waterproof member that is interposed between the first collar and the support member at the contacting surface thereof over the entire circumference around the axis of rotation, and a second waterproof member that is interposed between the second collar and the support member at the contacting surface thereof over the entire circumference around the axis of rotation. A continuous first groove is formed on the first collar or the support member at the contacting surface between the first collar and the support member over the entire circumference around the axis of rotation. The first waterproof member is disposed in the first groove and a continuous second groove is formed on the second collar or the support member at the contacting surface between the second collar and the support member over the entire circumference around the axis of rotation, the second waterproof member being disposed in the second groove.

Preferably, the groove is formed on the outer circumferential surface of the support member.

Preferably, the waterproof member is an O-ring.

Alternatively, the waterproof seal can be a lip seal.

Alternatively, the waterproof member can be water-repellent grease.

According to the present invention, since the waterproof member is disposed at the contacting surface between the support member that supports the bearing of the line roller in the radial direction and the collar that fixes the position of the bearing in the axial direction, it is possible to prevent water from entering the bearing between the support member and the collar.

DETAILED DESCRIPTION OF EMBODIMENTS

Figure 1:
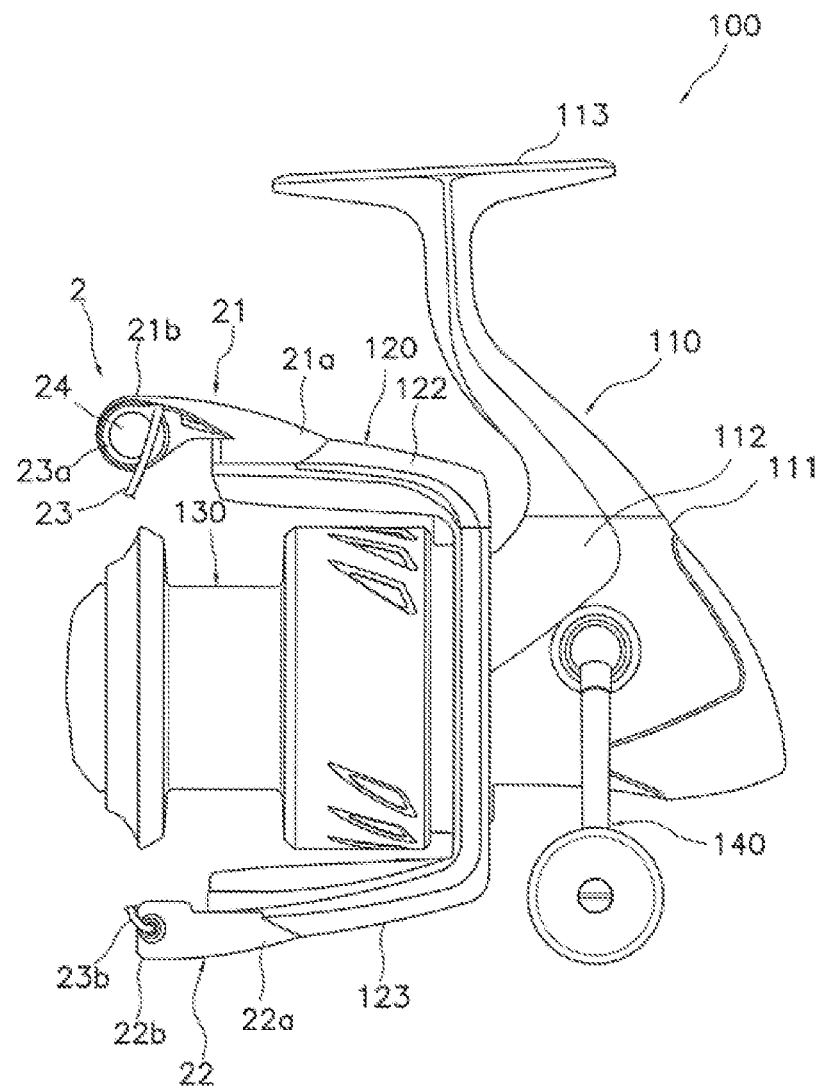
FIG. 1 is a side view of a spinning reel comprising a line roller according to an embodiment of the present invention.

An embodiment of the present invention will be described in detail below with reference to the drawings. The same or equivalent portions in the drawings have been assigned the same reference numerals.

First Embodiment

FIG. 1 is a side view of a spinning reel comprising a line roller according to an embodiment of the present invention. The spinning reel for fishing 100 comprises a reel body 110, a rotor 120, a spool 130, a handle 140, and a fishing line guide mechanism 2. The rotor 120 can be rotated about the spool 130 by rotating the handle 140. The spool 130 moves in reciprocating fashion in the left-right direction of FIG. 1 synchronously with the rotation of the rotor 120. The fishing line is guided by the fishing line guide mechanism 2 and wound around the spool 130 by the rotation of the rotor 120 about the left-right axis of FIG. 1. When the tackle attached to the end of the fishing line is cast, the fishing line wound around the spool 130 is unreeled in the left direction of FIG. 1. The direction in which the fishing line is unreeled or cast is defined as the front.

The reel body 110 has a case part 111 and a lid portion 112. The lid portion 112 can be detached from the case part 111. In addition, the case part 111 has a mounting portion 113 that extends in the longitudinal direction for attaching the spinning reel 100 under a fishing rod. The mounting portion 113 is a portion that is mounted on the fishing rod. The handle 140 can be mounted on either the left or right side of the reel body 110. In FIG. 1, the handle 140 is mounted on the right side when the spinning reel 100 is viewed from the front.

The rotor 120 has a first rotor arm 122 and a second rotor arm 123. The fishing line guide mechanism 2 is pivotably supported by the distal end portions of the first rotor arm 122 and the second rotor arm 123 so as to assume a line-guiding position and a line-releasing (casting) position. The fishing line guide mechanism 2 can be pivoted about the axis that intersects the axis of rotation of the rotor 120, i.e., about the vertical axis in FIG. 1. The fishing line guide mechanism 2 includes a first bail support member 21, a second bail support member 22, a bail 23, and a support shaft (support member) 24 that rotatably supports the guide member of the line roller.

The first bail support member 21 has a first end portion 21a and a second end portion 21b. The first end portion 21a is supported by the distal end portion of the first rotor arm 122 so as to be pivotable. The second end portion 21b of the first bail support member 21 supports a first end portion 23a of the bail 23 via the support shaft 24.

The second bail support member 22 has a first end portion 22a and a second end portion 22b. The first end portion 22a is supported by the distal end portion of the second rotor arm 123 so as to be pivotable. The second end portion 22b supports the second end portion 23b of the bail 23.

Figure 2:
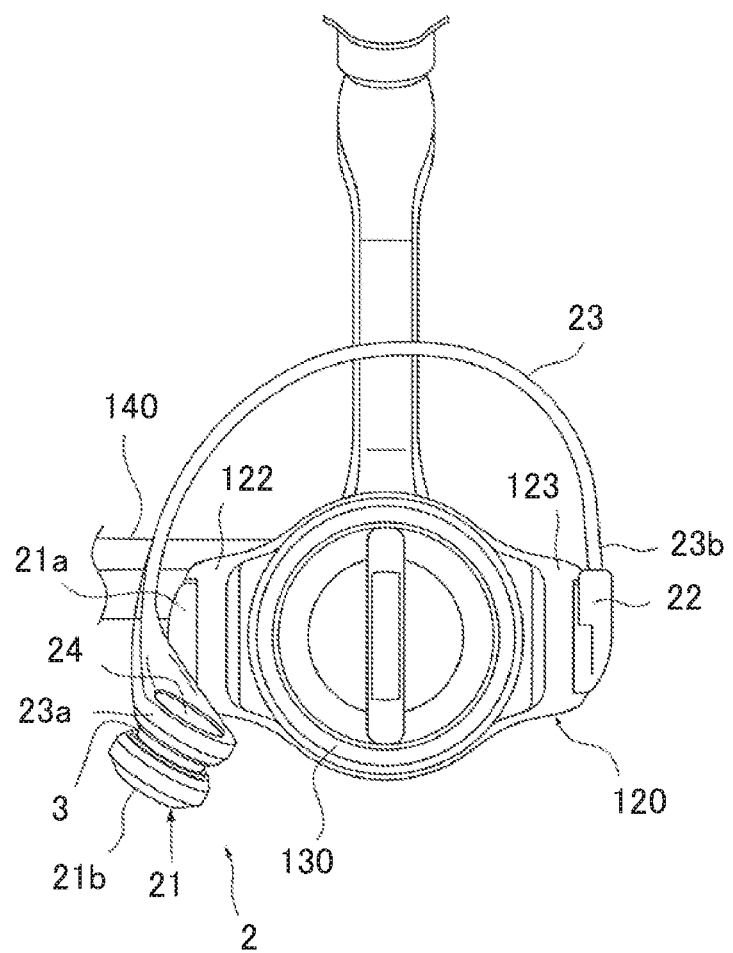
FIG. 2 is a front view of a spinning reel comprising a line roller according to an embodiment.

FIG. 2 is a front view of a spinning reel comprising a line roller according to the embodiment. FIG. 2 shows a state in which the fishing line guide mechanism 2 is assuming the line-guiding position. In FIG. 2, unlike FIG. 1, the handle 140 is mounted on the left side when the spinning reel 100 is viewed from the front.

The bail 23 is an essentially U-shaped member made from a stainless steel alloy. The bail 23 is curved to project outwardly along the outer peripheral surface of the spool 130 in the line-guiding position. The first end portion 23a of the bail 23 is supported by the first bail support member 21 via the support shaft 24. The second end portion 22b of the bail 23 is supported by the second bail support member 22.

When the fishing line guide mechanism 2 returns to the line-guiding position from the line-releasing position, the fishing line is disposed to reach the spool 130 via the outer side of the bail 23 in FIG. 2 from the front of the spinning reel 100. The end of the fishing line is fixed to the spool 130. When the rotor 120 turns clockwise in FIG. 2 in the line-guiding position, the fishing line slides on the outer side of the bail 23 toward the first end portion 23a and falls into the line roller 3. Since the spool 130 does not rotate, as the rotor 120 continues to rotate, the fishing line is pulled by the line roller 3 and wound around the spool 130.

The line roller 3 revolves about the axis of the rotor 120 as the rotor 120 rotates, and the guide member of the line roller 3, which contacts and guides the fishing line, rotates about the support shaft 24. It is necessary that the guide member of the line roller 3 turn smoothly about the support shaft 24 so as not to damage the fishing line.

Figure 3:
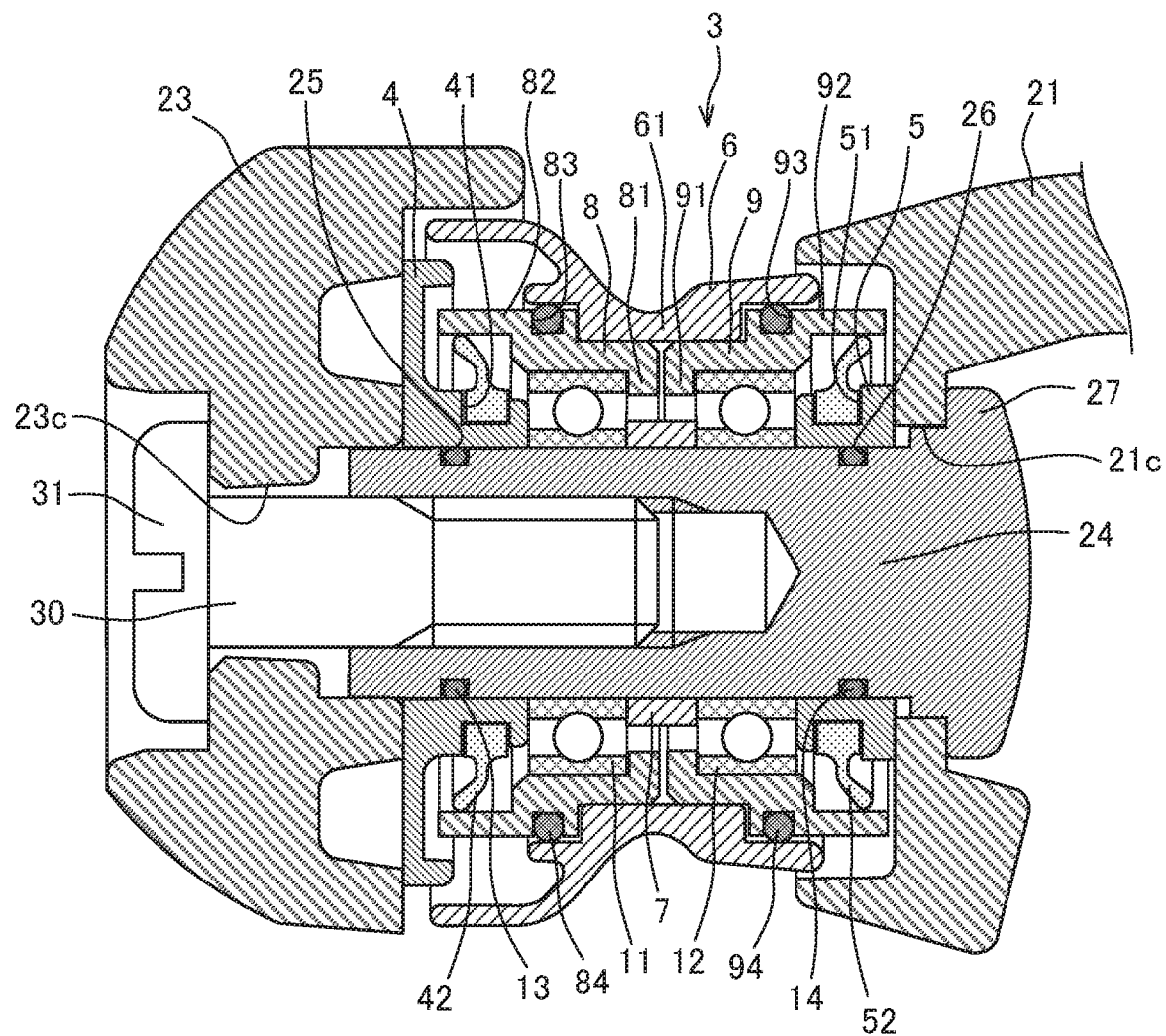
FIG. 3 is a cross-sectional view of the line roller according to a first embodiment.

FIG. 3 is a cross-sectional view of the line roller according to a first embodiment. FIG. 3 shows a cross section that passes through the axis around which a guide member 6 of the line roller 3 rotates. In the line roller 3, the cylindrical guide member 6 is supported around the support shaft 24 so as to be rotatable, with respect to the support shaft 24, which is supported by the first bail support member 21 and the bail 23 so as to be rotationally fixed. The fishing line is in contact with the outer circumferential surface of the guide member 6 and is guided to the spool 130 by the rotating guide member 6. The outer circumferential surface of the guide member 6 is the guide surface for guiding the fishing line. In the following explanation, the axis of rotation of the line roller 3 refers to the central axis around which the guide member 6 rotates. The axial direction means the direction in which the axis of rotation of the guide member 6 extends. The axial direction means the direction in which the supporting shaft 24 extends, and in FIG. 3, the left-right direction is the axial direction. In addition, the radial direction means the radial direction of a circle centered at the axis of rotation. Also, the circumferential direction means the circumferential direction of the circle centered at the axis of rotation.

The line roller 3 includes a guide member 6, a first bushing 8 and a second bushing 9, a first bearing 11 and a second bearing 12, a first collar 4, a spacer 7, a second collar 5, and the support shaft 24, which is a support member. The guide member 6 is supported and regulated by the first bushing 8 and the second bushing 9 in the axial direction and the radial direction. The first bushing 8 and the second bushing 9 are rotatably supported by the first bearing 11 and the second bearing 12, respectively. The inner circumferential surfaces of the first bearing 11 and the second bearing 12 are supported in the radial direction by the support shaft 24, which is a support member. The axial positions of the first bearing 11 and the second bearing 12 are fixed by the first collar 4, the spacer 7, and the second collar 5.

The guide member 6 has a step that is formed at both ends in the axial direction of a small diameter portion 61, which has a small inner diameter, and has a shape that expands in the axial direction and the radial direction from the step. The first bushing 8 and the second bushing 9 are each formed with flanges 81, 91, which project in the radially inward direction at one end in the axial direction, and have large diameter portions 82, 92 having a large diameter and steps formed on the outer diameter at the other ends. The first bushing 8 and the second bushing 9 are disposed such that the flanges 81, 91 oppose each other, and the flanges 81, 91 of the two bushings 8, 9 are sandwiched between the outer races of the first bearing 11 and the second bearing 12. The step on the inner circumferential surface of the guide member 6 is sandwiched in the axial direction between the large diameter portions 82, 92 of the first bushing 8 and the second bushing 9. In FIG. 3, the first bushing 8 and the second bushing 9 have the same shape and face each other in opposite directions.

The first collar 4, the first bearing 11, the spacer 7, the second bearing 12, and the second collar 5 are fitted on the support shaft 24 in that order. The spacer 7 is interposed between the inner race of the first bearing 11 and the inner race of the second bearing 12, and the other axial side surface of the inner race of the first bearing 11 abuts the first collar 4. The other axial side surface of the inner race of the second bearing 12 abuts the second collar 5. The other axial side surface of the first collar 4 abuts the bail 23 and is fixed. The other axial side surface of the second collar 5 abuts the first bail support member 21 and is fixed. A large-diameter flange 27 is formed at one end of the support shaft 24, and female threads are formed from the other end along the central axis. A bolt 30 is screwed into and tightened against the female threads of the support shaft 24. The flange 27 of the support shaft 24 is hooked onto the edge of a hole 21c formed in the first bail support member 21, and a head 31 of the bolt 30 is hooked onto an edge of a hole 23c formed in the bail 23. The bail 23, the first collar 4, the first bearing 11, the spacer 7, the second bearing 12, the second collar 5, and the first bail support member 21 are sandwiched and fixed by the head 31 of the bolt 30 and the flange 27 of the support shaft 24.

The line roller 3 can be exposed to water that is splashed in a fishing site environment. That is, water can be splashed onto the outer periphery of the guide member 6, the bail 23, the first bail support member 21, the head 31 of the bolt 30, and the flange 27 of the support shaft 24. Therefore, it is possible that water could enter the first bearing 11 and the second bearing 12 via the contacting surface between the first bushing 8 and the second bushing 9 of the guide member 6, the opening between the first bushing 8 and the first collar 4, and the opening between the second bushing 9 and the second collar 5. Moreover, it is possible that water could enter the first bearing 11 from the contacting surface between the bail 23 and the first collar 4 or the contacting surface between the bail 23 and the support shaft 24 through the contacting surface between the first collar 4 and the support shaft 24. In addition, it is possible that water could enter the second bearing 12 from the contacting surface between first bail support member 21 and the second collar 5 or the contacting surface between the first bail support member 21 and the support shaft 24 through the contacting surface between the second collar 5 and the support shaft 24. In the line roller 3 according to the first embodiment, those locations are waterproofed.

In this embodiment, an O-ring 84 is disposed in a groove 83 formed continuously on the outer circumferential surface of a large diameter portion 82 of the first bushing 8 over the entire circumference. The contacting surface between the guide member 6 and the first bushing 8 is sealed by the O-ring 84. Similarly, an O-ring 94 is disposed in a groove 93 formed continuously on the outer circumferential surface of a large diameter portion 92 of the second bushing 9 over the entire circumference, and the contacting surface between the guide member 6 and the second bushing 9 is sealed by the O-ring 94. The two O-rings 84, 94 prevent water from entering the first bearing 11 and the second bearing 12 from the contacting surfaces between the guide member 6, and the first bushing 8 and the second bushing 9. In addition, since the two O-rings 84, 94 are in close contact with the guide member 6, and the first bushing 8 and the second bushing 9, vibration and noise of the guide member 6, the first bushing 8 and the second bushing 9 are prevented.

An annular first lip seal 42 formed from an elastic body is disposed between the first collar 4 and the large diameter portion 82 of the first bushing 8. An annular second lip seal 52 formed from an elastic body is disposed between the second collar 5 and the large diameter portion 92 of the second bushing 9. The first lip seal 42 fits in a groove 41 that is continuous over the entire circumference of the outer periphery of the first collar 4. The second lip seal 52 fits in a groove 51 that is continuous over the entire circumference of the outer periphery of the second collar 5. The first lip seal 42 and the second lip seal 52 are respectively fit in the grooves 41, 51 while stretched from the relaxed state and are in close contact with the bottoms of the grooves 41, 51. The outer peripheral tip of the first lip seal 42 abuts or is close to the inner circumferential surface of the large diameter portion 82 of the first bushing 8 and seals the opening between the first collar 4 and the first bushing 8. The outer peripheral tip of the second lip seal 52 abuts or is close to the inner circumferential surface of the large diameter portion 92 of the second bushing 9 and seals the opening between the second collar 5 and the second bushing 9.

A first groove 25, which that is continuous over the entire circumference around the axis of rotation, is disposed where the outer circumferential surface of the support shaft 24 joins the first collar 4, and an O-ring 13, which is a first waterproof member, fits in the first groove 25. A second groove 26, which is continuous over the entire circumference around the axis of rotation, is disposed where the outer circumferential surface of the support shaft 24 joins the second collar 5, and an O-ring 14, which is a second waterproof member, fits in the second groove 26.

The O-ring 13 presses against the inner circumferential surface of the first collar 4 and the bottom of the first groove 25 and prevents water from entering the first bearing 11 via the contacting surface between the first collar 4 and the support shaft 24. The O-ring 14 presses against the inner circumferential surface of the second collar 5 and the bottom of the second groove 26 and prevents water from entering the second bearing 12 via the contacting surface between the second collar 5 and the support shaft 24.

As described above, by the line roller 3 of the first embodiment, the contacting surface and the opening that extend from the outside of the line roller 3 to the first bearing 11 and the second bearing 12 are sealed by the O-rings 84, 94, the first lip seal 42, the second lip seal 52, the O-ring 13, which is the first waterproof member, and the O-ring 14, which is the second waterproof member, and the first bearing 11, thereby waterproofing the second bearing 12. In particular, the O-ring 13 and the O-ring 14 prevent water from entering the first bearing 11 and the second bearing 12 via the contacting surface between the support shaft 24, which is the support member of the first bearing 11 and the second bearing 12, and the first collar 4 and the second collar 5, which fix the axial positions of the first bearing 11 and the second bearing 12. As a result, the waterproofing of the first bearing 11 and the second bearing 12 is maintained, as is the smooth rotation of the guide member 6.

The line roller 3 according to the first embodiment is not limited to the configuration shown in FIG. 3. For example, the orientations of the support shaft 24 and the bolt 30 can be reversed such that the flange 27 of the support shaft 24 hooks onto the bail 23, and the head 31 of the bolt 30 hooks onto the first bail support member 21. For example, the guide member 6 and the first bushing 8, or the guide member 6 and the second bushing 9 can be integrally formed. The guide member 6, the first bushing 8, and the second bushing 9 can be integrally formed as well. In this embodiment, the O-ring 84 or the O-ring 94 can be omitted.

The opening between the first bushing 8 and the first collar 4 or the opening between the second bushing 9 and the second collar 5 is not limited to being sealed with a lip seal. For example, a water-repellent grease, a labyrinth seal, or a magnetic fluid seal can be used. In addition, the first bearing 11 and the second bearing 12 can be combined and the guide member 6 can be supported by one bearing.

The first groove 25 in which the O-ring 13 is disposed can be disposed on the inner circumferential surface of the first collar 4. In this embodiment, the O-ring 13 presses against the outer circumferential surface of the support shaft 24 and the bottom of the first groove 25 disposed in the first collar 4. In addition, the second groove 26 in which the O-ring 14 can be disposed on the inner circumferential surface of the second collar 5. In this embodiment, the O-ring 14 presses against the outer circumferential surface of the support shaft 24 and the bottom of the second groove 26 disposed in the second collar 5.

In addition, the bail 23 and the first collar 4 can be integrally configured, and the bail 23 can directly fix the position of the first bearing 11. In this embodiment, the bail 23 also serves as the first collar 4, and the O-ring 13 seals the contacting surface between the bail 23 and the support shaft 24. In addition, the first bail support member 21 and the second collar 5 can be integrally configured, and the first bail support member 21 can directly fix the position of the second bearing 12. In this embodiment, the first bail support member 21 also serves as the second collar 5, and the O-ring 14 seals the contacting surface between the first bail support member 21 and the support shaft 24.

Figure 4:
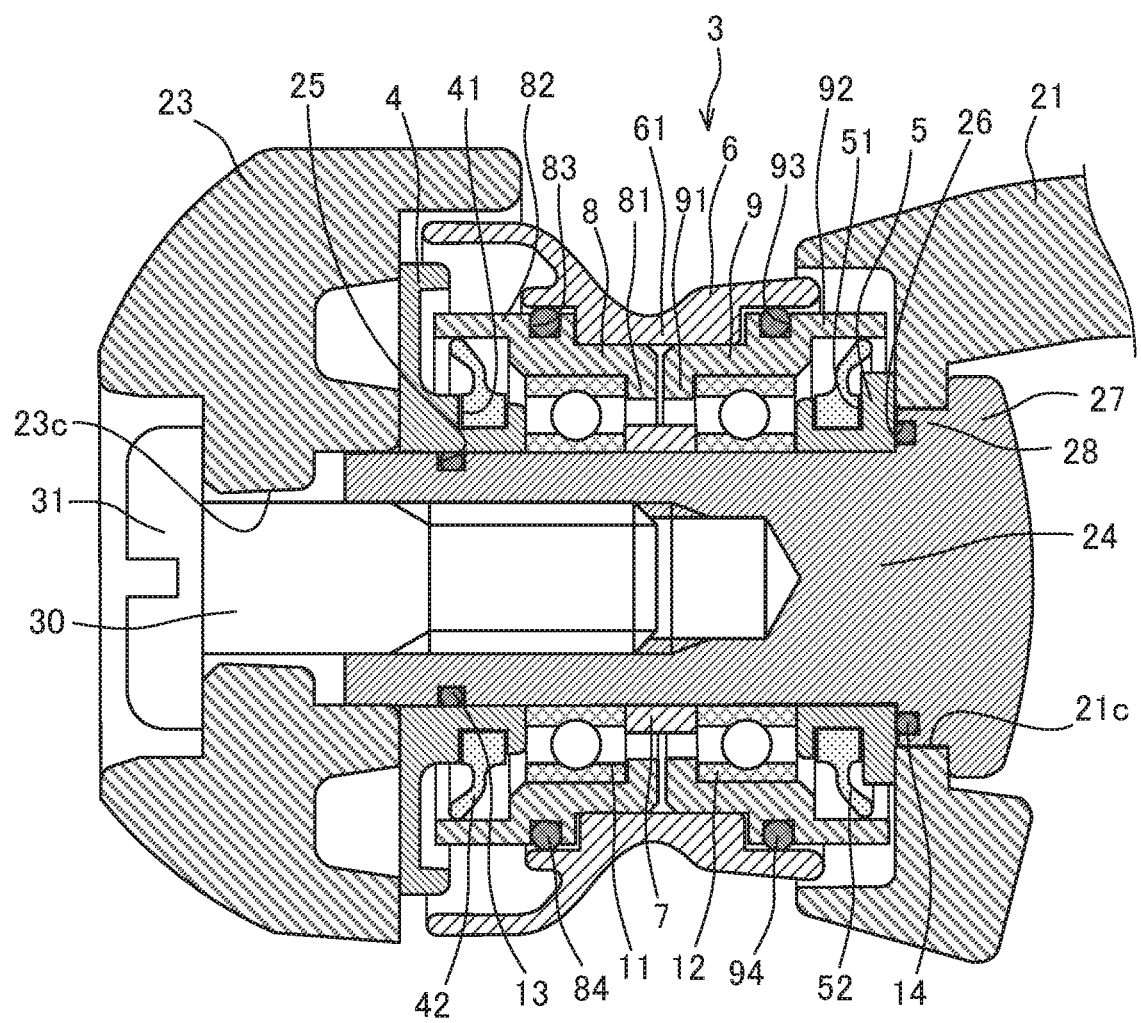
FIG. 4 is a cross-sectional view of the line roller according to a modified example of the first embodiment.

FIG. 4 is a cross-sectional view of the line roller according to a modified example of the first embodiment. In the modified example, the second groove 26 is disposed, not in the outer circumferential surface of the support shaft 24, but in a surface of the support shaft 24 that faces the axial side surface of the second collar 5 and intersects the axis of rotation. The other configurations are the same as those of the first embodiment.

In the modified example as well, the flange 27 of the support shaft 24 hooks onto the edge of the hole 21c of the first bail support member 21, and the first bail support member 21 abuts the axial side surface of the second collar 5 to fix the position of the second collar 5. In the modified example, the flange 27 has two steps, and a small diameter portion 28 of the flange 27 faces the axial side surface of the second collar 5. The axial side surface of the second collar 5 and the small diameter portion 28 of the flange 27 are extremely close to each other, and the surface of the small diameter portion 28 that intersects the axis of rotation and the axial side surface of the second collar 5 can be regarded as the contacting surface.

The second groove 26 is disposed on the surface of the small diameter portion 28 that intersects the axis of rotation, and the O-ring 14, which is the second waterproof member, is disposed in the second groove 26. The O-ring 14 presses against the axial side surface of the second collar 5 and the bottom of the second groove 26 and prevents water from entering the second bearing 12 via the contacting surface between the second collar 5 and the support shaft 24. The surface of the small diameter portion 28 that intersects the axis of rotation is not limited to a plane that is orthogonal to the axis of rotation, but can be a conical surface, a spherical surface, or the like.

For example, if the outer shape of the hole 21c of the first bail support member 21 and the portion of the support shaft 24 that fits into the hole 21c of the first bail support member 21 have an irregular shape that is not a cylindrical surface such that support shaft 24 does not rotate relative to the first bail support member 21, it is possible to fix the axial position of the second collar 5 with the support shaft 24. In this embodiment, the small diameter portion 28 of the flange 27 of the support shaft 24 abuts the second collar 5, and the surface of the small diameter portion 28 that intersects the axis of rotation and the axial side surface of the second collar 5 are contacting surfaces.

Figure 5:
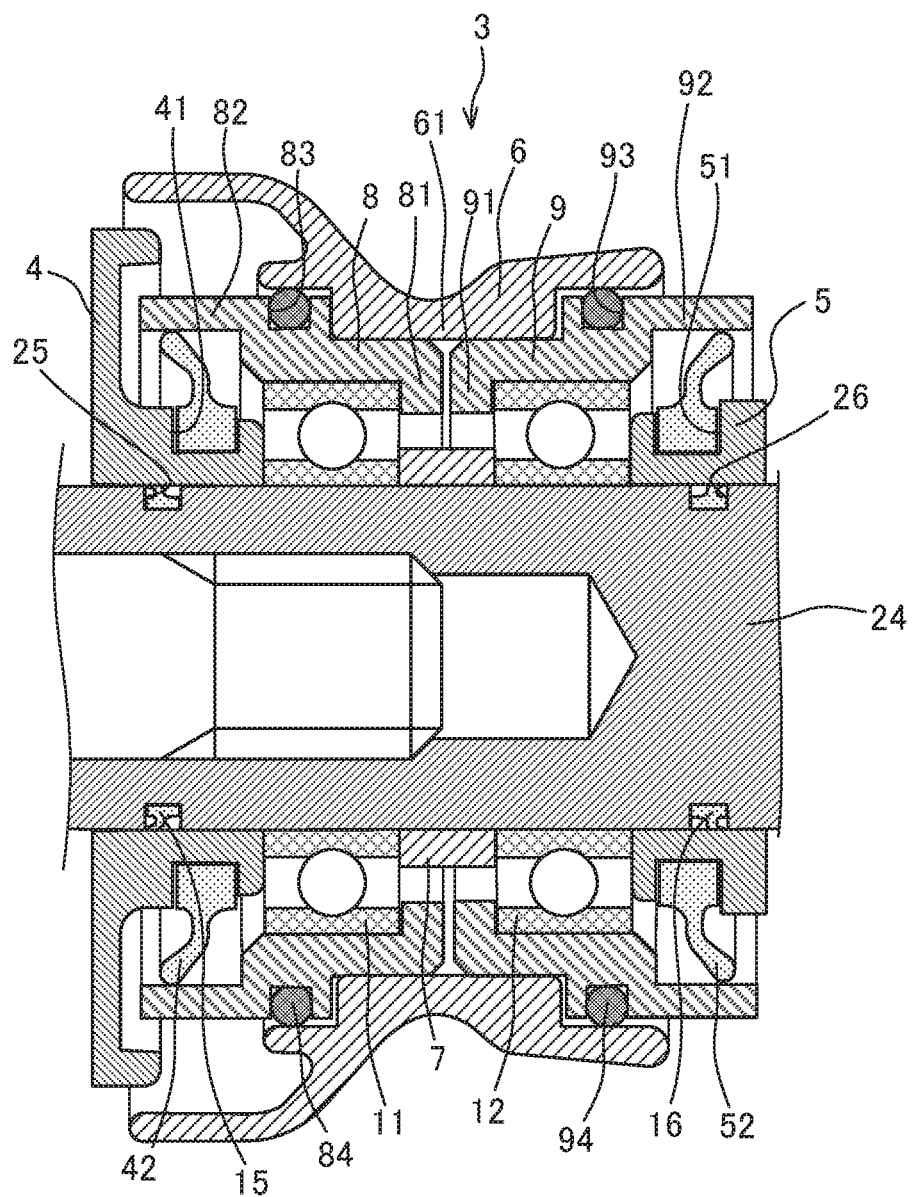
FIG. 5 is a cross-sectional view of the line roller when a waterproof member is a lip seal.

The first waterproof member and the second waterproof member are not limited to the O-rings 13, 14. A lip seal can be used as the waterproof member. FIG. 5 is a cross-sectional view of the line roller when the waterproof member is a lip seal. In FIG. 5, the main parts of the line roller 3 are shown, and the bail 23 and the first bail support member 21 have been omitted.

In the line roller 3 of FIG. 5, a lip seal 15 formed from an elastic body as the first waterproof member is disposed in the first groove 25, and a lip seal 16 formed from an elastic body as the second waterproof member is disposed in the second groove 26. The other configurations are the same as those in FIG. 3. The lip seal 15 and the lip seal 16 are fitted while stretched from the relaxed state and are in close contact with the bottoms of the first groove 25 and the second groove 26, respectively. The outer periphery of the lip seal 15 abuts the inner circumferential surface of the first collar 4, and the lip seal 15 prevents water from entering the first bearing 11 via the contacting surface between the first collar 4 and the support shaft 24. The outer periphery of the lip seal 16 abuts the inner circumferential surface of the second collar 5 and prevents water from entering the second bearing 12 via the contacting surface between the second collar 5 and the support shaft 24.

As described in the first embodiment, in the embodiment of FIG. 5, the first groove 25 can be disposed on the inner circumferential surface of the first collar 4, and the lip seal 15 can be disposed on the first collar 4. In addition, the second groove 26 can be disposed on the inner circumferential surface of the second collar 5, and the lip seal 16 can be disposed on the second collar 5. In this embodiment, the lips of the lip seals 15, 16 are oriented in the radially inward direction. The lip seals 15, 16 are formed such that there is no gap between the cross section of the lip seals 15, 16 and the cross section of the grooves 25, 26, making it is possible to prevent the lip seals from being twisted during assembly of the line roller 3.

The cross-sectional shape of the lip seals 15, 16 is not limited to that shown in FIG. 5. The cross-sectional shape can be any shape such as a polygonal shape, an arc-like shape, or a combination of a portion of an ellipse and a polygon, as long as the lip seals are disposed in the grooves 25, 26 and functions as seals. In addition, as in the modified example of FIG. 4, the second groove 26 can be disposed on a surface of the support shaft 24 that faces the axial side surface of the second collar 5 and intersects the axis of rotation.

Figure 6:
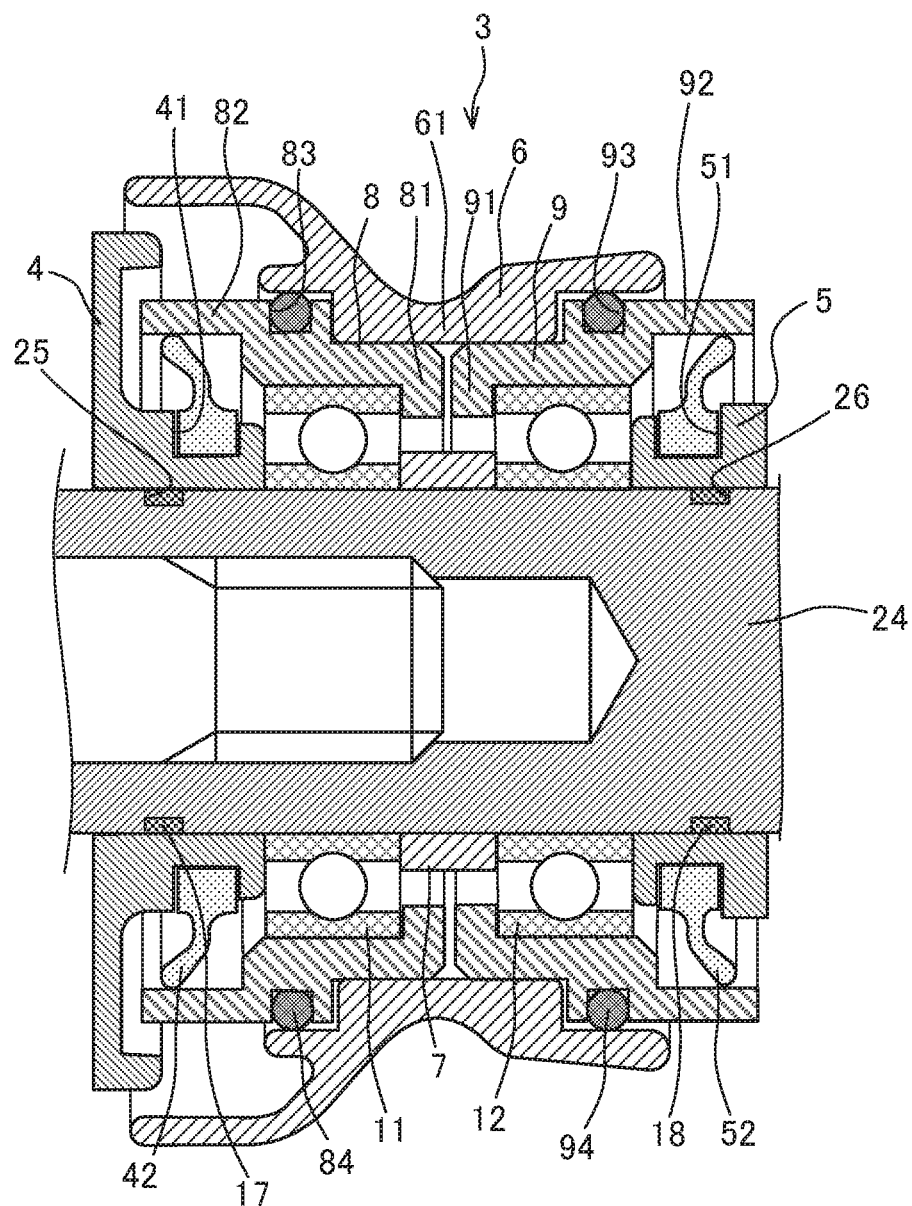
FIG. 6 is a cross-sectional view of the line roller when the waterproof member is water-repellent grease.

Water-repellent grease can be used as the first waterproof member and the second waterproof member. FIG. 6 is a cross-sectional view of the line roller when water-repellent grease is used as the waterproof member. In FIG. 6, the main parts of the line roller 3 are shown, and the bail 23 and the first bail support member 21 have been omitted.

In the line roller 3 of FIG. 6, water-repellent grease 17 as the first waterproof member is disposed in the first groove 25, and water-repellent grease 18 as the second waterproof member is disposed in the second groove 26. The other configurations are the same as those of FIG. 3. The first groove 25 and the second groove 26 are filled with the water-repellent greases 17, 18 during assembly, and the water-repellent greases 17, 18 also enter the minute gaps at the contacting surfaces between the support shaft 24 and the first collar 4 and the second collar 5. The water-repellent greases 17, 18 prevent water from entering the first bearing 11 via the contacting surface between the first collar 4 and the support shaft 24, and prevent water from entering the second bearing 12 via the contacting surface between the second collar 5 and the support shaft 24.

The first groove 25 and the second groove 26 can be formed on the inner circumferential surfaces of the first collar 4 and the second collar 5, respectively. In this embodiment as well, the first groove 25 and the second groove 26 are filled with the water-repellent greases 17, 18. The first groove 25 can be disposed on both the inner circumferential surface of the first collar 4 and the outer circumferential surface of the support shaft 24. In this embodiment, the first groove of the first collar 4 and the first groove 25 of the support shaft 24 need not oppose each other. The second groove 26 can be disposed on both the inner circumferential surface of the second collar 5 and the outer circumferential surface of the support shaft 24. In this embodiment, the second groove of the second collar 5 and the second groove 26 of the support shaft 24 need not oppose each other.

Second Embodiment

Figure 7:
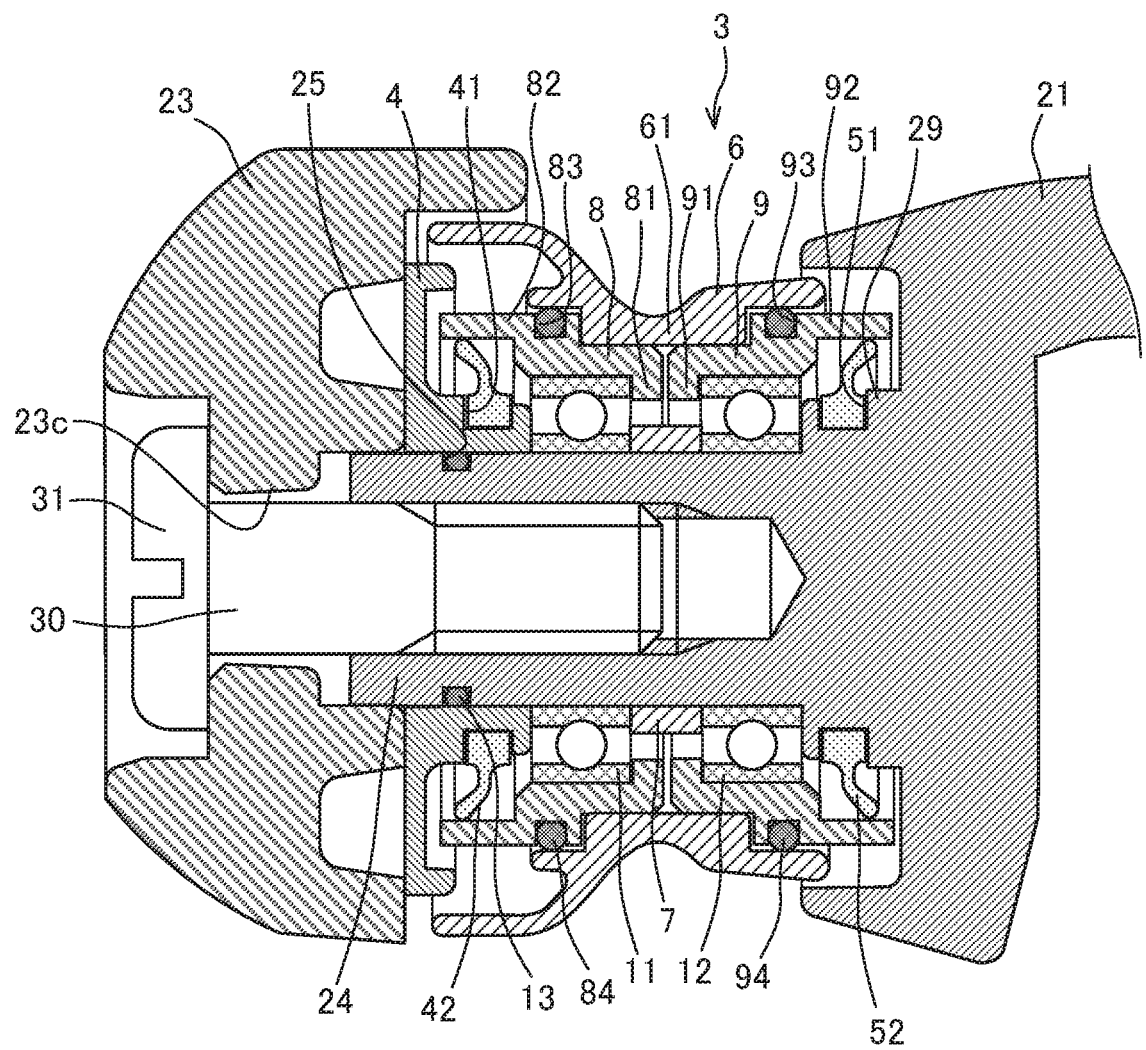
FIG. 7 is a cross-sectional view of the line roller according to a second embodiment of the present invention.

FIG. 7 is a cross-sectional view of the line roller according to a second embodiment of the present invention. In the second embodiment, the first bail support member 21, the support shaft 24, and the second collar 5 are integrally formed. Therefore, the second groove 26 and the second waterproof member are not provided. The other configurations are the same as in the first embodiment.

In the second embodiment, the first bail support member 21 also serves as the support shaft 24 and supports the inner circumferential surfaces of the first bearing 11 and the second bearing 12 in the radial direction. In addition, a boss portion 29 with a diameter that is one step larger than the support shaft 24 portion also serves as a second collar that abuts the inner race of the second bearing 12 and fixes the axial position of the second bearing 12. The bail 23, the first collar 4, the first bearing 11, the spacer 7, and the second bearing 12 are sandwiched and fixed by the head 31 of the bolt 30 and the boss portion 29 of the first bail support member 21. In the second embodiment, the support shaft 24 and the second collar 5 are integrated without a contacting surface therebetween. The groove 51 is formed on the outer periphery of the boss portion 29 of the first bail support member 21, and the second lip seal 52 fits in the groove 51. The opening between the boss portion 29 and the second bushing 9 is sealed with the second lip seal 52.

In the second embodiment, the contacting surface between the guide member 6 and the first bushing 8 is sealed with the O-ring 84, and the contacting surface between the guide member 6 and the second bushing 9 is sealed with the O-ring 94. An annular first lip seal 42 formed from an elastic body is disposed between the first collar 4 and the large diameter portion 82 of the first bushing 8, and the first lip seal 42 seals the opening between the first collar 4 and the first bushing 8.

A first groove 25 that is continuous over the entire circumference around the axis of rotation is disposed where the outer circumferential surface of the support shaft 24 joins the first collar 4, and an O-ring 13, which is a first waterproof member, is fitted into the first groove 25. The O-ring 13 presses against the inner circumferential surface of the first collar 4 and the bottom of the first groove 25 and prevents water from entering the first bearing 11 via the contacting surface between the first collar 4 and the support shaft 24.

In the second embodiment, as was described in the first embodiment, the orientations of the support shaft 24 and the bolt 30 can be reversed, and the support shaft 24, the bail 23, and the first collar 4 can be integrally configured. In this embodiment, the first groove 25 and the first waterproof member are omitted, and the O-ring 14, which is the second waterproof member, is disposed in the second groove 26 formed at the contacting surface between the second collar 5 and the support shaft 24.

In a configuration similar to the modified example of FIG. 4, the first bail support member 21 and the support shaft 24 can be kept separate, and the support shaft 24 and the second collar 5 can be integrally configured. In this embodiment, the outer shape of the hole 21c of the first bail support member 21 and the portion of the support shaft 24 that fits into the hole 21c of the first bail support member 21 have an irregular shape that is not a cylindrical surface such that support shaft 24 does not rotate relative to the first bail support member 21. If the support shaft 24 and the second collar 5 are integrally formed without a contacting surface therebetween, the second groove 26 and the second waterproof member are unnecessary.

In the second embodiment, the first groove 25 in which the O-ring 13 is disposed can be disposed on the inner circumferential surface of the first collar 4. In this embodiment, the O-ring 13 presses against the outer circumferential surface of the support shaft 24 and the bottom of the first groove disposed on the first collar 4. The bail 23 and the first collar 4 can be integrally configured, and the bail 23 can directly fix the position of the first bearing 11. In this embodiment, the bail 23 also serves as the first collar 4, and the O-ring 13 seals the contacting surface between the bail 23 and the support shaft 24. In addition, the first lip seal 15 or the water-repellent grease 17 can be used instead of the O-ring 13.

What is claimed is:

1. A line roller for guiding fishing line to a spool of a spinning reel for fishing, comprising:
   a cylindrical guide member having a guide surface configured to guide the fishing line to the spool;
   a bearing rotatably supporting an inner circumferential surface of the guide member;
   a support member supporting an inner circumferential surface of the bearing in a radial direction;
   a collar abutting an axial side surface of the bearing and fixing an axial position thereof;
   a waterproof member interposed between the collar and the support member at a contacting surface thereof over an entire circumference around an axis of rotation of the guide member; and a groove disposed on at least one of the collar or the support member at the contacting surface between the collar and the support member over the entire circumference around the axis of rotation, and the waterproof member being disposed in the groove.

2. The line roller according to claim 1, wherein
the collar is a first collar and the first collar and a second collar sandwich the bearing in an axial direction to fix an axial position thereof,
the waterproof comprises a first waterproof member that is interposed between the first collar and the support member at the contacting surface thereof over the entire circumference around the axis of rotation, and a second waterproof member is interposed between the second collar and the support member at a contacting surface thereof over an entire circumference around the axis of rotation,
the groove comprises a first groove disposed on the first collar or the support member at the contacting surface between the first collar and the support member over the entire circumference around the axis of rotation, and the first waterproof member is disposed in the first groove, and a second groove disposed on the second collar or the support member at the contacting surface between the second collar and the support member over the entire circumference around the axis of rotation, and the second waterproof member is disposed in the second groove.

3. The line roller according to claim 1, wherein
the groove is disposed on an outer circumferential surface of the support member.

4. The line roller according to claim 1, wherein
the waterproof member is an O-ring.

5. The line roller according to claim 1, wherein
the waterproof member is a lip seal.

6. The line roller according to claim 1, wherein
the waterproof member is water-repellent grease.

* * * * *